Jan. 30, 1962    M. M. ARNOULD    3,018,758
MULTI-PURPOSE FISH AQUARIUM COVER
Filed April 2, 1958
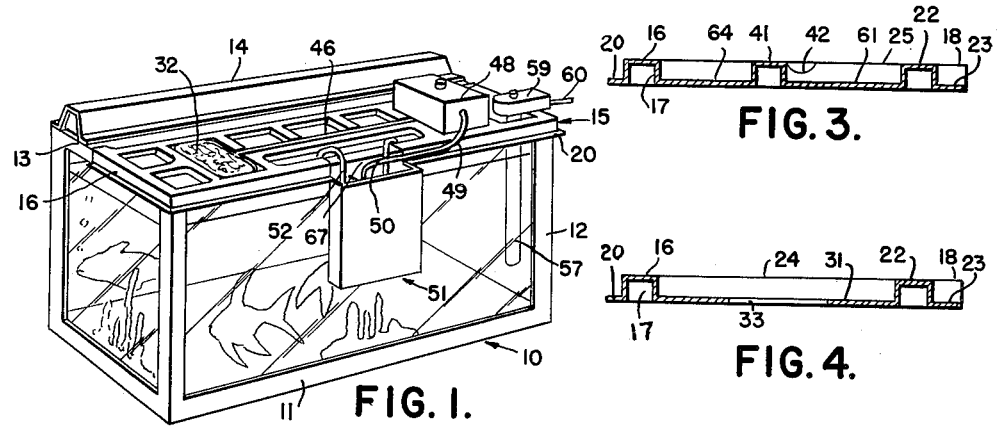
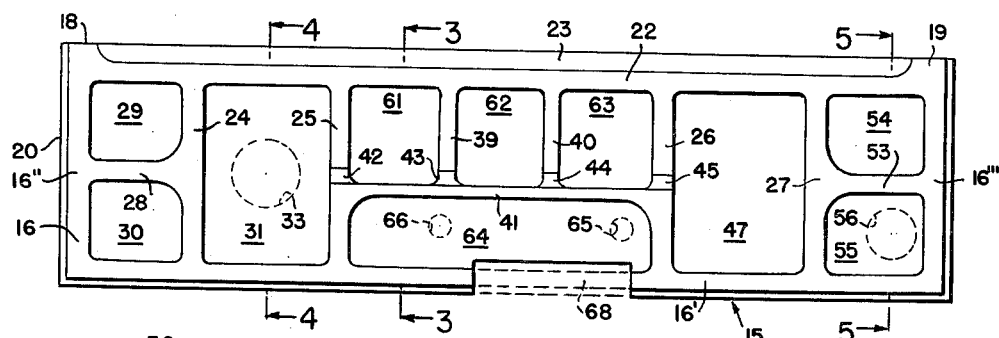
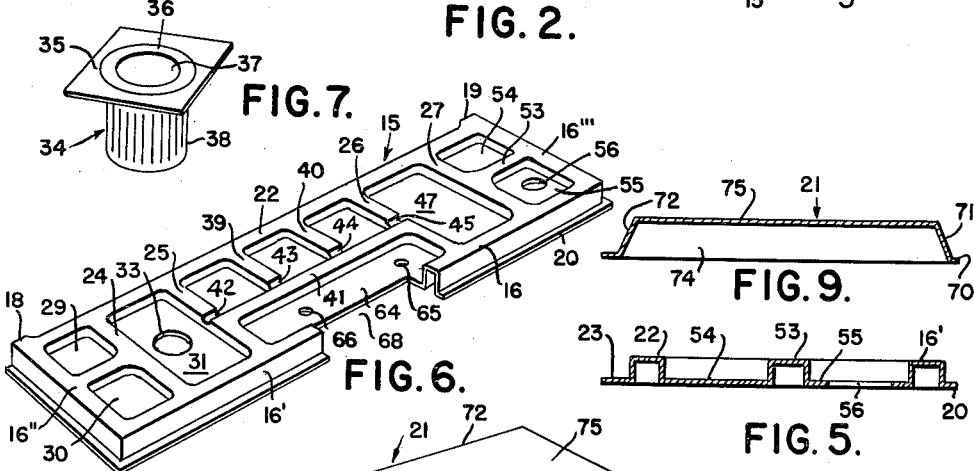
INVENTOR.
Marcel M. Arnould
BY
L. S. Saulsbury
ATTORNEY

United States Patent Office 3,018,758
Patented Jan. 30, 1962

3,018,758
MULTI-PURPOSE FISH AQUARIUM COVER
Marcel M. Arnould, East Orange, N.J., assignor to Metal Frame Aquarium Company, Pinebrook, N.J.
Filed Apr. 2, 1958, Ser. No. 725,971
2 Claims. (Cl. 119—5)

This invention relates to a multi-purpose fish aquarium cover.

It is the principal object of the present invention to provide a multi-purpose fish aquarium cover which will not only serve to cover the open top of aquariums adjacent to the lamp reflector but will also serve as a special article support for food containers and various implements used in the daily operation of the aquarium.

It is another object of the invention to provide a multi-purpose fish aquarium cover which is so formed and shaped that portions of the same can be broken or cut away so that the cover can be readily adapted and improvised for the various pieces of equipment or implements to be installed upon or suspended into the aquarium from the cover.

It is still another object of the invention to provide a multi-purpose fish aquarium cover which has its outer edges depressed from the underside to receive the top edges of the ends and rear side of the aquarium and to fit firmly thereover so as to be held against lateral displacement therefrom.

It is a further object of the invention to provide a multi-purpose fish aquarium cover which is formed to tightly fit the top edges of the fish aquarium and to prevent moisture and water leaking under or splashing over the edges of the aquarium.

It is a still further object of the invention to provide a multi-purpose fish aquarium cover that is formed of thin sheet plastic material which can be cut or broken away for the purposes of installing implements upon the cover with simple cutting tools such as with shears, knife or the like so that the ultimate user of the cover can readily adapt his cover to his particular implements that he may have for the operation of his aquarium.

It is a still further object of the invention to provide a multi-purpose fish aquarium cover which is depressed from the top so that any water that may be split upon the cover when placing or arranging the implements or when feeding the fish through openings in the cover will be kept sectionalized on the cover and may pass through openings in areas of the cover and be drained back into the aquarium.

It is a still further object of the invention to provide a multi-purpose fish aquarium cover which will support the various implements and food containers that has an upper cover part which may be easily fitted to the cover and will overlie the implements and food containers so as to eliminate any unsightly exposure of them and to keep dust and pets from disturbing the implements or foods resting thereon.

Other objects of the invention are to provide a multi-purpose fish aquarium cover adapted for the storage of implements, equipment and food containers, having the above objects in mind, which is of simple construction, inexpensive to manufacture, easy to install upon the fish aquarium, light in weight, of pleasing appearance, efficient and effective in use.

For other objects and for a better understanding of the invention, reference may be had to the following detailed description taken in connection with the accompanying drawing, in which:

FIGURE 1 is a rear perspective view of a fish aquarium with the light reflector and the aquarium storage cover of the present invention mounted thereon and with the various pieces of equipment including the outside filter disposed upon the cover with the cutouts having been made for the filter and its drain syphons and for the suspension of the worm feeder and the heater therethrough, FIG. 2 is an enlarged top plan view of the fish aquarium cover with the side edge having the cut away to accommodate the outside filter that is suspended from the side edge of the aquarium, FIGS. 3, 4 and 5 are respectively transverse sectional views of the cover as viewed respectively on lines 3—3, 4—4, and 5—5 of FIG. 2, FIG. 6 is a perspective view of the cover removed from the tank shown in FIG. 1, and after it has been completely cut and adapted for the accessory arrangement shown in FIG. 1, FIG. 7 is a perspective view of a worm dispenser adapted to be suspended from an opening in the cover, FIG. 8 is a top lid or cover part adapted to enclose all of the pieces of equipment, implements and food containers supported on the main cover, and FIG. 9 is a transverse sectional view of the top cover taken on line 9—9 of FIG. 8.

Referring now particularly to the figures, 10 represents the usual glass fish aquarium having metal bottom, side and top edge frame pieces 11, 12, and 13 overlying the edges of the glass. The top edges have substantial thickness and serve as a support for a reflector 14 and a storage cover 15 embodying the features of the present invention. The reflector 14 is normally held against lateral displacement from the top edges 13 of the aquarium by depending abutments from the underside of the reflector. The aquarium storage cover 15 is held by a flange 16 that is depressed upwardly from the underside and adapted to encompass and fit tightly over the top edges 13 of the aquarium. The cover 15 is held against lateral and upward displacement upon the aquarium and in a water tight manner to prevent water from overflowing the top edges of the aquarium. The exterior of the aquarium supporting table surface is thereby kept dry and free of any water that might be splashed over the top edges of the aquarium.

Once the present cover has been fitted over the top edges of the aquarium force will be required to lift the same from the top edges and it thus becomes a more or less permanent part of the aquarium. It is held on the edges of the aquarium in a seal tight manner and cannot slip or be readily displaced therefrom. The flange 16 has the depression upon the underside as indicated at 17 and it extends fully and continuously along the rear side and ends of the aquarium as at 16′, 16″ and 16′″. The end portions 16″ and 16′″ of the flange are open at 18 and 19, to allow the top edge of the tank to carry through the flange. A small lip 20 extends around the full length of the flange 16 so as to make the drop or exterior portion of the flange rigid and also to serve as a stop or rest for a top lid part 21, FIG. 8, which can be placed over the storage cover 15 to enclose the various pieces of equipment, implements and food containers lying within the sectionalized areas in the storage cover 15 which will be described more in detail hereafter.

The front of the storage cover 15 has an upwardly depressed runner portion 22 that renders the front of the cover rigid and joins the end portions 16″ and 16′″ of the flange 16 and 18 and 19 and is in itself provided with a wide reinforcing lip 23 running along the front edge of the cover. Between this runner portion 22 and the portion of the flange 16′ that runs along the rear of the aquarium are a plurality of interconnecting transverse upwardly depressed portions 24, 25, 26 and 27. Two such portions being at each side of the cover. The portion 24 has an upwardly depressed longitudinally-extending portion 28 that connects with end portion 16" of the flange 16 to provide tray sections 29 and 30 in which food containers can be disposed.

Between the portions 24 and 25 is a large tray storage 31 serving to support a fish net 32, FIG. 1, a hole 33 may be cut in this section with a knife or similar tool to accommodate a worm dispenser 34, FIG. 7 that has a top flange 35 that can rest upon the bottom of the tray section 31 and a round ribbed portion 36 providing for an opening 37 into which the feed worms can be placed. This worm dispenser is sufficiently long so that its slit and perforated bottom end 38 will lie in the water within the aquarium to permit flotation of the worms within the dispenser. The fish net 32 will overlie this worm dispenser and any water from the net can drain through the opening 40 into the tank.

Interposed between the transverse upwardly depressed or ribbed portions 25 and 26 laterally spaced from one another are intermediate rib portions 39 and 40 that join and a longitudinally extending upwardly depressed or ribbed portion 41 that runs between the ribbed portions 25 and 26. The transverse rib portions 25, 39, 40 and 26 are grooved respectively at 42, 43, 44 and 45 to accommodate handle 46 of the fish net 32. These grooves are sufficiently raised to permit the easy insertion of the finger so that the handle can be readily lifted.

Between the ribbed portions 26 and 27, is a large tray section 47 on which the air pump 48 can be supported. This air pump 48 has a plastic air tube 49 that extends into the outside filter 51 to deliver the operating air thereto. A water intake tube 52 takes the water from the aquarium and delivers it to the outside filter 51. A tube 50 returns aerated water from the filter to the aquarium. Between the ribbed portions 27 and an end flange portion 16''' is a longitudinally-extending inter-connecting rib portion 53 that will provide for tray section 54 and an electric heater support section 55 through which a hole 56 may be made to accommodate an electric heater 57 having a top head 59 that extends over and is clamped to the edge of the flange portion 16'''. An electric cord 60 extends from the head 59 of the heater by which electric current is supplied to the heater.

Between the ribbed portions 25, 39, 40 and 26 are tray sections 61, 62 and 63 which serve to support food containers. Between longitudinally-extending ribbed portion 41 and the rear flange portion 16' is a recess 64 in which holes 65 and 66 may be cut to accommodate the respective water tubes 50 and 52.

The filter 51 has a hanger bracket 67 that must extend over the edge of the aquarium tank to support the filter 51 and in order that this can be done the rear portion 16' is cut away at the location of the filter to accommodate this bracket 67.

Any water that may splash through the openings 65, 66 and 68 will be collected in the recess 64 and drained through these openings into the aquarium before it has had an opportunity to be splashed onto the supporting table surface. The top lid part 21 has a flange 70 that will rest upon the flange 20 of the storage cover 15. It has elevated sides 71, 72 and end walls 73 and 74 and a top wall 75. The top wall 75 is elevated sufficiently to overlie all of the food containers and pieces of equipment that may be disposed upon the storage cover. This top lid part is similarly pressed from thin plastic sheet and can be cut with shears or a knife to accommodate the pieces of the equipment that may have to extend over and through the flange 16 of the storage cover 15. This top lid 21 will prevent dust and pets from gaining access to the storage cover. The top part 21 can be easily lifted from the storage cover at times when it is necessary to feed the fish or to work with any piece of equipment supported thereon.

It should now be apparent that there has been provided an efficient and effective storage cover assembly for fish aquariums on which not only the food containers can be stored but which serves as a support for all the pieces of equipment and implements that are needed for the operation of a fish aquarium.

While various changes may be made in the detailed construction, it shall be understood that such changes shall be within the spirit and scope of the present invention as defined by the appended claims.

What is claimed is:

1. A fish aquarium storage cover of thin sheet flexible and resilient plastic-like material that can be easily cut to accommodate and support various pieces of equipment used in the operation of a fish aquarium, comprising an upwardly depressed U-shaped in cross-section resilient flange around the periphery of the cover adapted to tightly and resiliently fit over the top edge of the aquarium, other upwardly depressed means constituting rib portions extending at spaced intervals throughout the top of the cover and joining said flange to provide stiffening means therefor, said rib portions defining tray sections upon the cover, said tray sections adapted to be cut to provide openings through which pieces of equipment can be extended and a substantially horizontal strengthening rib extending outwardly from along the outer portion of the upwardly depressed U-shaped flange constituting a reinforcement for the flange.

2. A fish aquarium cover of thin sheet flexible and resilient plastic-like material that can easily be cut to accommodate and support various pieces of equipment used in the operation of a fish aquarium as defined in claim 1 and said resilient flange being open at at least one portion to permit the top edges of the aquarium to run therethrough.

References Cited in the file of this patent

UNITED STATES PATENTS

| | | |
|---|---|---|
| 1,970,970 | Nolan | Aug. 21, 1934 |
| 2,426,865 | Fink | Sept. 2, 1947 |
| 2,776,642 | Sepersky | Jan. 8, 1957 |
| 2,792,811 | Di Chiaro | May 21, 1957 |